March 30, 1948.  R. H. LARSON  2,438,710
FILM GATE
Filed Oct. 7, 1946

INVENTOR.
Robert H. Larson.
BY Robert L. Kahn
ATTORNEY.

Patented Mar. 30, 1948

2,438,710

UNITED STATES PATENT OFFICE 2,438,710

FILM GATE

Robert H. Larson, Batavia, Ill.

Application October 7, 1946, Serial No. 701,783

9 Claims. (Cl. 88—17)

This invention relates to a film gate. The invention, while of general utility in projectors, is particularly adapted for use in connection with projectors for use with slide film.

Present-day types of film gates make it difficult to thread film through the gate or adjust the same in desired position. As a rule, present-day construction provides no satisfactory means for maintaining the film in position in the gate until the gate itself has been closed. Thus, with projectors now available, it is frequently necessary that several attempts be made to adjust the film in proper position before success is attained. Frequently, during the process of adjusting the film, the length of film being handled is scratched, punctured or damaged.

The invention hereinafter described provides a construction which simplifies threading of film through the gate and makes it possible to adjust the film in predetermined position with respect to the gate in a quick and effective manner.

Figure 1:
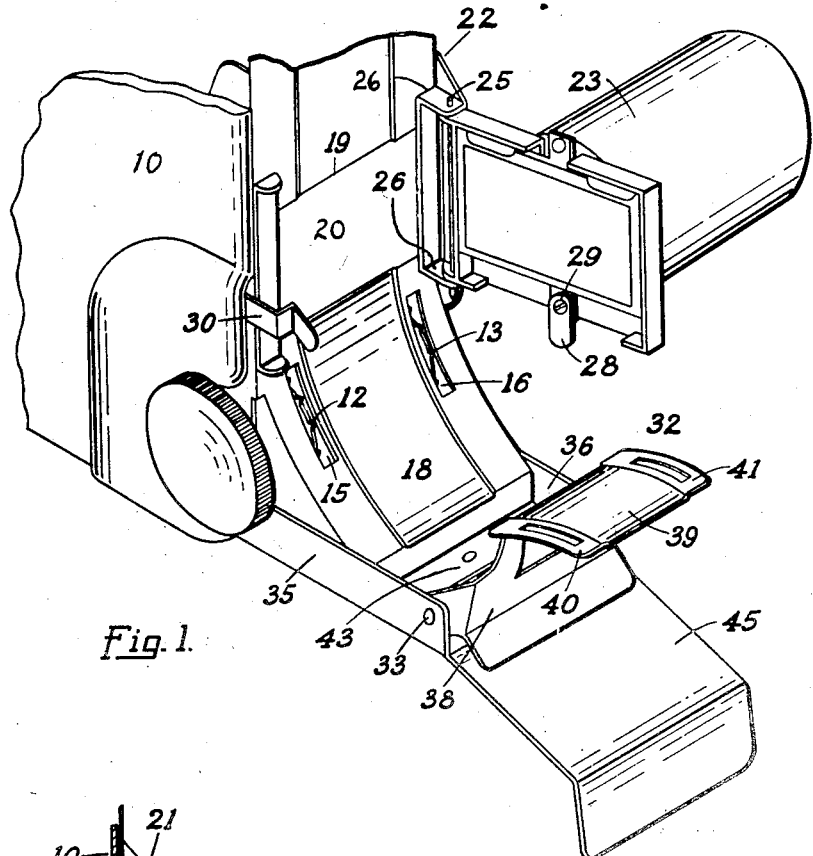
Figure 2:
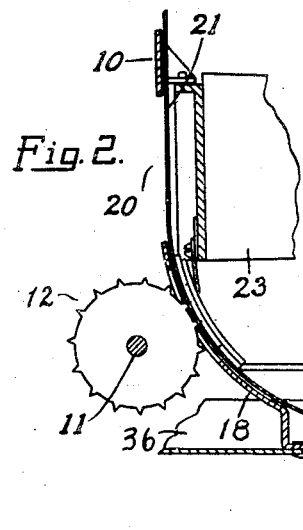
Figure 3:
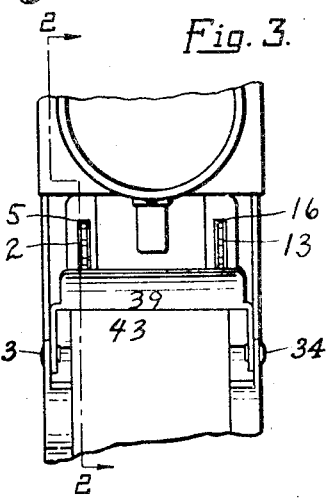

In the drawing, an exemplary embodiment of the invention is illustrated, it being understood, however, that various modifications may be made without departing from the spirit of the invention. Referring therefore, to the drawing, Figure 1 is a perspective view of a film gate in open position. Figure 2 is a section on line 2—2 of Figure 3 with the film retainer closed. Figure 3 is a front view of part of the film gate of Figure 1 but in partly closed position.

A projector body of any desired construction is shown fragmentarily at 10. The body supports shaft 11 and sprockets 12 and 13 for feeding film. Sprockets 12 and 13 have portions projecting through slots 15 and 16 in film guide 18. The guide may consist of metal or any other suitable material and may be curved as shown along the length of film travel. Film guide 18 has top 19 adjacent film gate 20 where a frame for projection is located. Film 21 is adapted to be moved past gate 20 by turning the knob on shaft 11. Gate 20 has, pivoted at one side 22, lens barrel 23 containing a suitable lens system for projecting a focused image on a screen not shown. Lens barrel 23 may be mounted in any suitable manner as by pin 25 supported in ears 26 at the side of the film gate. Barrel 23 is provided at the bottom inside end with tongue 28 supported on the barrel structure by any suitable means, such as screw 29. The projector housing supports spring clip 30 at the side of the film gate opposite to pin 25, spring clip 30 being adapted to cooperate with the lens barrel structure to maintain the barrel in a locked position.

Pivotally mounted adjacent the bottom end of guide 18 is film retainer 32. Film retainer 32 may be mounted at 33 and 34 on flanges 35 and 36 extending forwardly from the body of the projector housing. Retainer 32 comprises arm 38, cross member 39 and slotted end pieces 40 and 41. The slotted end pieces are adapted to fit over the projecting portions of sprockets 12 and 13. The entire retaining member is shaped so that cross piece 39 and slotted members 40 and 41 will lie against film extending from gate 20 down over guide 18. The engagement between cross piece 39 and the slotted ends, on the one hand, and guide 18, on the other hand, is sufficiently snug so that film 21 must be disposed in correct relation to the sprockets with the sprocket teeth extending through slots in the film before the retainer can be locked in position.

It will be noted that, at pivots 33 and 34 of retainer 32, the metal or material of which the retainer and guide are formed is cut out to provide open region 43. Thus, any film may be threaded through space 43 to over-lay supporting strip 45.

Retainer 32 is so dimensioned with respect to the bottom of lens barrel 23 that it is necessary for retainer 32 to be closed before the lens barrel may be closed. Tongue 28 extending down from the barrel over-lies cross piece 39 to prevent opening of retainer 32 when the barrel is in locked position.

In order to thread a length of film through the projector, the barrel is opened and retainer 32 moved away from the sprockets to an open position as shown in Figure 1. Film 21 may then be threaded through the gate and over the guide and disposed against the sprockets in desired position. Retainer 32 is then closed, after which the lens barrel may be locked in place and the projector is ready for use.

It is evident that tongue 28 may be disposed on retainer 32 and shaped to prevent the retainer from being closed after the lens barrel has been closed. It is also possible to rearrange the pivot pins of both the lens barrel and retainer so that one or the other or both are parallel to the line of film travel.

What is claimed is:

1. A film gate construction comprising a film gate proper, a lens barrel, means for pivotally mounting said barrel at said gate, said barrel being movable on its pivot to open and close said gate, a film guide adjacent one end of said gate along the line of film travel, means adjacent said guide for moving said film through said gate, a film retainer for holding film in position against said guide, means for pivotally mounting said retainer for movement to an open or closed position, and means for preventing the closure of said film retainer while said lens barrel is in a closed position, said retainer and lens barrel being successively movable to closed positions.

2. A film gate construction comprising a film gate proper, a lens barrel, means for pivotally mounting said barrel at said gate to be movable to an open or closed position respectively, a film guide adjacent one end of said gate along the line of film travel, means adjacent said guide for moving said film through said gate, a film retainer for holding film in position against said guide, means for pivotally mounting said retainer with said pivot axis extending perpendicular to the line of travel of said film in said gate, said retainer being movable on its pivot axis to an open position free of the guide and to a closed position to retain said film against said guide, said retainer and guide being shaped to provide an open region through which film may be threaded readily when said retainer is open.

3. A film gate construction comprising a film gate proper, a lens barrel, means for pivotally mounting said barrel at said gate, said barrel being movable on its pivot to open and close said gate, a film guide adjacent one end of said gate along the line of film travel, means adjacent said guide for moving said film through said gate, a film retainer for holding film in position against said gate, means for pivotally mounting said retainer for movement to an open or closed position, said retainer and lens barrel having adjacent portions movable with respect to said gate when moved on their respective pivot axes, said retainer being movable to a fully closed position only when said lens barrel is open and means for locking said lens barrel in a closed position, said lens barrel having means for maintaining said film retainer closed when said lens barrel is locked.

4. The structure of claim 3 wherein the means for maintaining said film retainer closed comprises a tongue on a portion of said lens barrel adjacent to said film retainer.

5. The structure of claim 3 wherein said lens barrel has its pivot parallel to the line of film travel through said gate and wherein the film retainer has its pivot perpendicular to the line of film travel with the pivot being on the side of said retainer remote from the lens barrel.

6. A film gate construction comprising a film gate proper, a lens barrel, means for pivotally mounting said barrel at a side of said gate to be movable to an open or closed position, said pivot being parallel to the line of film travel, a film guide adjacent one end of said gate along the line of film travel, means adjacent said guide for moving said film through said gate, a film retainer for holding film in position against said guide, means for pivotally mounting said retainer with said pivot axis extending perpendicular to the line of travel of said film in said gate, said retainer pivot being disposed on the side of said retainer remote from the film gate, means extending between the adjacent portions of said retainer and lens barrel for maintaining said retainer closed when said lens barrel is closed and means for locking said lens barrel in a closed position.

7. The structure of claim 6 wherein said retainer has a substantial portion of material cut away adjacent the retainer pivot to facilitate threading of the film when the barrel and retainer are both open.

8. A film gate construction comprising a film gate proper, a lens barrel, means for pivotally mounting said barrel at said gate to be movable to an open or closed position respectively, a film guide adjacent one end of said gate along the line of film travel, means adjacent said guide for moving said film through said gate, a film retainer for holding film in position against said guide, means for pivotally mounting said retainer with said pivot axis extending perpendicular to the line of travel of said film in said gate, said retainer being movable on its pivot axis to an open position free of the guide and to a closed position to retain said film against said guide, and means on said retainer and barrel to prevent closure of said retainer while said barrel is in a closed position.

9. A film gate construction comprising a film gate proper, a lens barrel, means for pivotally mounting said barrel at said gate to be movable to an open or closed position respectively, a film guide adjacent one end of said gate along the line of film travel, means adjacent said guide for moving said film through said gate, a film retainer for holding film in position against said guide, means for pivotally mounting said retainer with said pivot axis extending perpendicular to the line of travel of said film in said gate, said retainer being movable on its pivot axis to an open position free of the guide and to a closed position to retain said film against said guide, said lens barrel having its pivot axis perpendicular to the line of travel of film through said guide, and means for preventing the closure of said film retainer from an open position while said lens barrel is in a closed position.

ROBERT H. LARSON.

REFERENCES CITED

The following references are of record in the file of this patent:

UNITED STATES PATENTS

| Number | Name | Date |
| --- | --- | --- |
| 1,191,145 | Baldwin | July 18, 1916 |
| 1,738,762 | DeVault | Dec. 10, 1929 |